United States Patent Office 3,045,288
Patented July 24, 1962

3,045,288
PROCESS FOR DIMENSIONALLY STABILIZING ARTICLES FABRICATED FROM POLYTETRAFLUOROETHYLENE
George E. Sykora, Tulsa, Okla., assignor to Well Surveys Incorporated, a corporation of Delaware
No Drawing. Filed Oct. 14, 1957, Ser. No. 689,783
4 Claims. (Cl. 18—55)

This invention relates generally to a process for controlling tolerances of articles fabricated of thermoplastic resins and more particularly to a technique for heat treating variously shaped bodies of polytetrafluoroethylene.

Since the introduction of articles fabricated from polytetrafluoroethylene and sold under the trademark Teflon, many investigations relating to their mechanical and/or electrical characteristics have been performed and reported to the public. While the insulating properties of such articles cannot by gainsaid, it also has been recognized that the dimensional instability of articles molded or otherwise formed of polytetrafluoroethylene has restricted its use in areas where tolerances are critical.

The prior art relating to fabricating articles of polytetrafluoroethylene is generally cognizant of the fact that it is a thermoplastic resin which does not react in the expected manner. It is known, for example, that this particular thermoplastic resin undergoes a transition from its normal crystalline structure to an amorphous gel at a temperature of approximately 617° F. As a result of this fact, it has long been proposed that articles molded from finely divided particles or powder of polytetrafluoroethylene be sintered at a temperature above this transition temperature for varying periods of time in order to reduce the possibility of flaws deleteriously affecting the finished product. In addition to the many proposals for improving the characteristics of polytetrafluoroethylene by sintering it have been proposals recognizing generally that a slow cooling rate tends to relieve internal stresses and results in stronger products. On the other hand, a rapid quench, whether air or liquid, has been recommended to produce an article having much less shrinkage but not to relieve internal stresses.

It is a well-known shortcoming of polytetrafluoroethylene fabricated articles that their shrinkage with age is often severe and erratic. The problem of controlling shrinkage arises, to a large extent, because the aging properties of thermoplastic resins of the polytetrafluoroethylene type are not understood too well. It has been variously suggested that articles fabricated from polytetrafluoroethylene continue to shrink for from 10 hours up to a week or more after an article has been sintered and cooled to ambient temperature. The outgrowth of this uncertain aging process is that many articles that must be critically dimensioned are molded, sintered and machined to the critical dimensions only to be found to be dimensionally in error once they have reached their ultimate user. This problem has suggested various approaches but none have provided an entirely successful solution without approximating expected shrinkages and attempting to make allowances therefor.

The instant invention overcomes many of the prior art shortcomings by providing for a simple annealing process wherein the dimensional variations of articles fabricated from polytetrafluoroethylene are virtually eliminated thereby assuring that articles once machined to their proper dimensions do not change to any appreciable extent in the future.

Therefore, the prime object of the present invention is to produce polytetrafluoroethylene articles wherein factors contributing to dimensional instability are largely eliminated. A feature of the present invention pertains to a process for annealing articles constructed from polytetrafluoroethylene under carefully controlled conditions in a critical temperature range whereby this broad object is accomplished.

According to the present invention, the object is accomplished by heating a polytetrafluoroethylene article, after it has been removed from the mold and/or sintered, at a temperature just below the gel temperature of 617° F.; maintaining this temperature for a period sufficiently long to stabilize the dimensional changes; and, thereafter cooling the polytetrafluoroethylene article to room temperature.

In one particular exemplary embodiment of the instant invention, it has been found that a test specimen 2 inches in diameter and ½ inch thick, which has an "as molded" specific gravity of between 2.05 and 2.15, has the requisite dimensional stability after being stabilized at a temperature between 610 and 615° F. for a sufficient period of time. In this particular example, it was found that the dimensional change of the diameter of the test specimen as a percentage thereof leveled off asymptotically at approximately 1.3 percent at between 40 and 60 hours annealing time. Additionally, dimensional checks at later periods showed substantially no further change in the dimension. Investigations varying annealing times for these particular test specimens showed that the dimensional change in the diameter expressed as a percentage thereof increased exponentially from an hour or so annealing time up to the approximately 40 hour period. Thereafter, the rate of change approached zero rapidly.

It is important in carrying out the process of the instant invention that the temperature be very carefully maintained just below the gel transition point for polytetrafluoroethylene. If the temperature is allowed to exceed this transition point, portions of the material become amorphous and the advantage of crystalline annealing is interrupted.

In other investigations using test samples ranging from ¼ inch diameter rods up to 4 or more inch diameter rods and varying in length up to two feet or more, it has been found necessary to maintain the annealing temperature for periods exceeding 20 hours and in some cases, upwards of 80 hours to substantially eliminate dimensional instability. The time required for such annealing is dependent on the maximum thicknesses of the articles sought to be dimensionally stabilized. The critical thing is to stabilize the temperature of all parts of the article at a point just below the gel transition point. Obviously, thicker pieces of polytetrafluoroethylene will require longer periods of annealing to raise the innermost portion thereof to the required temperature so that the inventive concept becomes operative.

However, there is an upper limit which comes into play when the time cycle of annealing becomes too great. At this point, a loss of weight phenomenon occurs. For example, loss of weight is found at annealing times exceeding 80 hours, which weight losses range up to 0.5 percent at a cycle time of 125 hours. The possible material degradation which results from appreciable loss of weight is, in extent, as yet unknown. However, the fact that such a loss of weight is experienced indicates that parts be roughed out where the sections are so thick as to require a cycle time where loss of weight is a significant factor.

It should be apparent that the present proposed process for annealing polytetrafluoroethylene articles, in order to guarantee dimensionally stable articles, can be performed after any sintering operation previously carried out to remove flaws in the articles. The basic requirement in the practice of the present invention is that the temperature be carefully controlled at a point just below the gel transition point and that the time of the cycle be sufficient for the rate of change of the dimensions to approach zero.

While it is known that sintering increases the homogeneity and the density of polytetrafluoroethylene articles, it has been found that the instant annealing process also does so, but with one decided advantage. This advantage resides in the fact that density improvement by means other than the instant annealing run the risk of degrading the excellent mechanical and electrical properties of polytetrafluoroethylene articles. Contrariwise, the present invention improves the density without endangering the superior mechanical and electrical properties of articles fabricated from polytetrafluoroethylene.

It should be apparent that while the process of the present invention is disclosed with respect to articles made entirely from polytetrafluoroethylene, it is equally applicable to mixtures of polytetrafluoroethylene and other components such as powdered iron, brass, copper, bronze, graphite, asbestos, silica, calcium and the like. These materials may be mixed in the form of fibers with the polytetrafluoroethylene wherever it is more convenient to do so. The process is also applicable to interpolymers of tetrafluoroethylene with other polymerizable compounds, e.g., isobutylene or ethylene. It should be noted, of course, that the mechanical and electrical properties of the various combinations including a part only of polytetrafluoroethylene will be affected by such combinations. However, the control of dimensional stability in such articles by the instant disclosed process of annealing should be comparatively unaffected thereby.

It is to be understood, of course, that the above described process is merely illustrative of the application of the principle of the instant invention. Numerous other arrangements may be devised by those skilled in the art without departing from the spirit and scope of this invention.

What is claimed is:

1. A process for fabricating articles substantially composed of polytetrafluoroethylene and having substantially stable dimensions and shape, said process comprising the steps of subjecting finely divided granules of fibrous or crystalline polytetrafluoroethylene to pressure to form a body substantially having a preselected shape and preselected dimensions, baking said body under said pressure during a preselected time interval substantially at a temperature sufficient to convert said fibrous body to an amorphous gel, thereafter reducing the baking temperature the minimum amount necessary to convert said amorphous gel to a fibrous polytetrafluoroethylene body having a shape and dimensions more precisely approaching the preselected shape and dimensions desired, removing said forming pressure from said more precisely shaped and dimensioned fibrous body, continuing said baking at said reduced temperature during a time interval of at least 20 hours but insufficient to cause said more precisely shaped and dimensioned fibrous body to lose any significant amount of weight while being sufficient to substantially relieve all internal stresses which might otherwise cause said more precisely shaped and dimensioned fibrous body to substantially deviate in shape and dimension after all baking is stopped.

2. A process for fabricating articles substantially composed of fibrous or crystalline polytetrafluoroethylene and having substantially stable and precise dimensions and shape, said process comprising the steps of subjecting finely divided granules of fibrous or crystalline polytetrafluoroethylene to pressure to form a body having substantially a preselected shape and preselected dimensions, sintering said body under said pressure during a preselected time interval substantially at an ambient temperature sufficient to convert said crystalline polytetrafluoroethylene body to an amorphous gel, thereafter reducing said ambient temperature the minimum degree necessary to convert said amorphous gel to a crystalline polytetrafluoroethylene body having a shape and dimensions more precisely approaching the preselected shape and dimensions desired, maintaining said more precisely shaped and dimensioned crystalline body substantially constantly at said reduced ambient temperature during a time interval of at least 20 hours but insufficient to cause degradation of the material composing said crystalline body but sufficient to substantially relieve all internal stresses which would otherwise alone cause said more precisely shaped and dimensioned body to shrink or fracture after said body is removed from said forming pressure and reduced to room temperature.

3. A process for fabricating articles substantially composed of polytetrafluoroethylene and having substantially a preselected shape and dimensions, said process comprising the steps of subjecting a quantity of finely divided particles of said polytetrafluoroethylene to a pressure in a manner such that a body is formed having said preselected shape and dimensions, and thereafter annealing said body at a temperature generally immediately below the gel temperature of polytetrafluoroethylene during a pre-selected time interval functionally related in extent to the maximum preselected cross-sectional dimension of said body but not less than 20 hours.

4. A process for fabricating articles substantially composed of polytetrafluoroethylene and having substantially a preselected shape and dimensions, said process comprising the steps of subjecting a quantity of finely divided particles of said polytetrafluoroethylene to a pressure in a manner such that a body is formed having said preselected shape and dimensions, and thereafter annealing said body substantially at a temperature immediately below the gel temperature of polytetrafluoroethylene substantially during a time interval greater than twenty hours and not greater than eighty hours.

References Cited in the file of this patent

UNITED STATES PATENTS

| | | |
|---|---|---|
| 2,311,818 | Dawson | Feb. 23, 1943 |
| 2,456,262 | Fields | Dec. 14, 1948 |
| 2,781,552 | Gray | Feb. 19, 1957 |

FOREIGN PATENTS

| | | |
|---|---|---|
| 484,849 | Canada | July 15, 1952 |

OTHER REFERENCES

Dupont Information Bulletin No. X–7c "Teflon-Tetrafluoroethylene Resin, Molding Techniques," E. I. du Pont Nemours & Co., July 1957.

Dupont "Teflon, Tetrafluoroethylene Resins, Properties, Uses," E. I. du Pont de Nemours & Co., August 1957.